United States Patent [19]

Rosa

[11] 4,358,818
[45] Nov. 9, 1982

[54] THYRISTOR-CONTROLLED AC/DC CONVERTER SYSTEM

[75] Inventor: John Rosa, Pittsburgh, Pa.

[73] Assignee: Westinghouse Electric Corp., Pittsburgh, Pa.

[21] Appl. No.: 264,871

[22] Filed: May 18, 1981

[51] Int. Cl.³ .............................................. H02M 1/12
[52] U.S. Cl. ........................................ 363/46; 363/87
[58] Field of Search ....................... 363/44, 45, 46, 87

[56] References Cited

U.S. PATENT DOCUMENTS

| 3,453,526 | 7/1969 | Bowles | 363/46 |
| 3,767,998 | 10/1973 | Beling | 363/45 |
| 4,314,322 | 2/1982 | Plow et al. | 363/46 |

Primary Examiner—William M. Shoop
Attorney, Agent, or Firm—C. M. Lorin

[57] ABSTRACT

In a thyristor-controlled converter system the non-canonical harmonics are minimized by active filtering through control of the firing angle of the thyristors in accordance with the undesired harmonic component.

7 Claims, 14 Drawing Figures

UNFILTERED DC OUTPUT VOLTAGE OF CONVERTER - 5V/cm

FILTERED DC OUTPUT VOLTAGE OF CONVERTER, WITHOUT ACTIVE FILTER - .5V/cm

TIME SCALE: 2ms/cm

UNFILTERED DC OUTPUT VOLTAGE OF CONVERTER - 5V/cm

FILTERED DC OUTPUT VOLTAGE OF CONVERTER WITH ACTIVE FILTER - .5V/cm

TIME SCALE: 2ms/cm

UNFILTERED DC OUTPUT VOLTAGE OF CONVERTER – 5V/cm

OUTPUT VOLTAGE OF 1ST. STAGE($J_3$) OF 120 Hz ACTIVE FILTER CHANNEL – .2V/cm

TIME SCALE: 2 ms/cm

UNFILTERED DC OUTPUT VOLTAGE OF CONVERTER – 5V/cm

OUTPUT VOLTAGE OF 2ND STAGE($J_4$) OF 120 Hz ACTIVE FILTER CHANNEL – .5 V/cm

TIME SCALE: 2ms/cm

OUTPUT VOLTAGES OF ACTIVE FILTER CHANNELS:

60 Hz CHANNEL -.05 V/cm (AF$_1$)

120 Hz CHANNEL -.50 V/cm (AF$_2$)

180 Hz CHANNEL -.10 V/cm (AF$_3$)

TIME SCALE: 2ms/cm

UNFILTERED DC OUTPUT VOLTAGE OF CONVERTER - 10 V/cm

INPUTS TO NULL DETECTOR (13) WITHOUT ACTIVE FILTER - 2V/cm

TIME SCALE: 2ms/cm

UNFILTERED DC OUTPUT VOLTAGE OF CONVERTER – 10V/cm

INPUTS TO NULL DETECTOR (13) WITH ACTIVE FILTER 2V/cm

TIME SCALE: 2ms/cm

UNFILTERED DC OUTPUT VOLTAGE OF CONVERTER – 10V/cm

INPUTS TO NULL DETECTOR (13) WITH ACTIVE FILTER – .10 V/cm

TIME SCALE: 2ms/cm

THYRISTOR-CONTROLLED AC/DC CONVERTER SYSTEM

BACKGROUND OF THE INVENTION

The invention relates to thyristor-controlled AC/DC converters in general, and more particularly to the reduction of harmonics in such converters for the generation of a pure DC voltage at the output.

The invention is based on the fact that while harmonic components forming the ripple superimposed on the DC output voltage theoretically include as the lowest frequency harmonic a component of the order of $f_s \cdot p$ (where p is the pulse number of the converter and $f_s$ the fundamental frequency of the AC power supply), due to unavoidable imperfections there also exist "non-canonical" harmonics which have frequencies lower than $f_s \cdot p$.

Conventional passive filtering techniques can handle the "canonical" harmonics of relatively high frequency, and this is achieved without too much difficulty or cost. Elimination of the "non-canonical" harmonics, however, which are of the order of $f_s$, $2f_s$, $3f_s$, would require large and expensive passive filters to obtain sufficient attenuation at the lower frequencies of the "non-canonical" harmonics as well as at the higher frequencies of the "canonical" harmonics.

Accordingly, it is now proposed to use active filtering to reduce the amplitudes of the non-canonical low-frequency harmonics, thereby limiting the use of passive filters to harmonics of high frequency.

Typically, in a 12-pulse converter operating from the 60 Hz line, the non-canonical harmonics which are to be eliminated by active filtering would be 60 Hz, 120 Hz and 180 Hz, whereas the lowest order "canonical" harmonic would occur at $(12 \times 60) = 720$ Hz.

Non-dissipative, or "active" filtering is known. Active filtering for minimizing an undesired harmonic component through an active branch of current source has been done in the past by deriving from the output a control signal representative of the undesired component and injecting, through an additional power component controlled by the representative signal, into the output a compensating current of proper phase and magnitude to automatically neutralize the undesired component throughout the active branch. See, for instance, U.S. Pat. No. 4,241,395 of Eric J. Stacey et al.

In the proposed invention the thyristor converter itself acts as the active branch of current source, thus obviating the need of any additional power component to inject the compensating current.

SUMMARY OF THE INVENTION

In a static-controlled converter system, recognizing that the non-canonical frequencies are discrete and predictable, there is provided a plurality of frequency selective circuits each associated with one non-canonical frequency, for modifying the firing angle of the converter thyristors in relation to the undesired harmonic component at the output of the converter. Each particular circuit is given at high gain in relation to the component to be attenuated at the particular selected frequency. The high gain of any such frequency selective circuit is so chosen as to roll off very rapidly on both sides of the critical frequency. The result is high attenuation at the unwanted harmonic frequency, obtained with good stability.

DESCRIPTION OF THE PREFERRED EMBODIMENT

Figure 1:
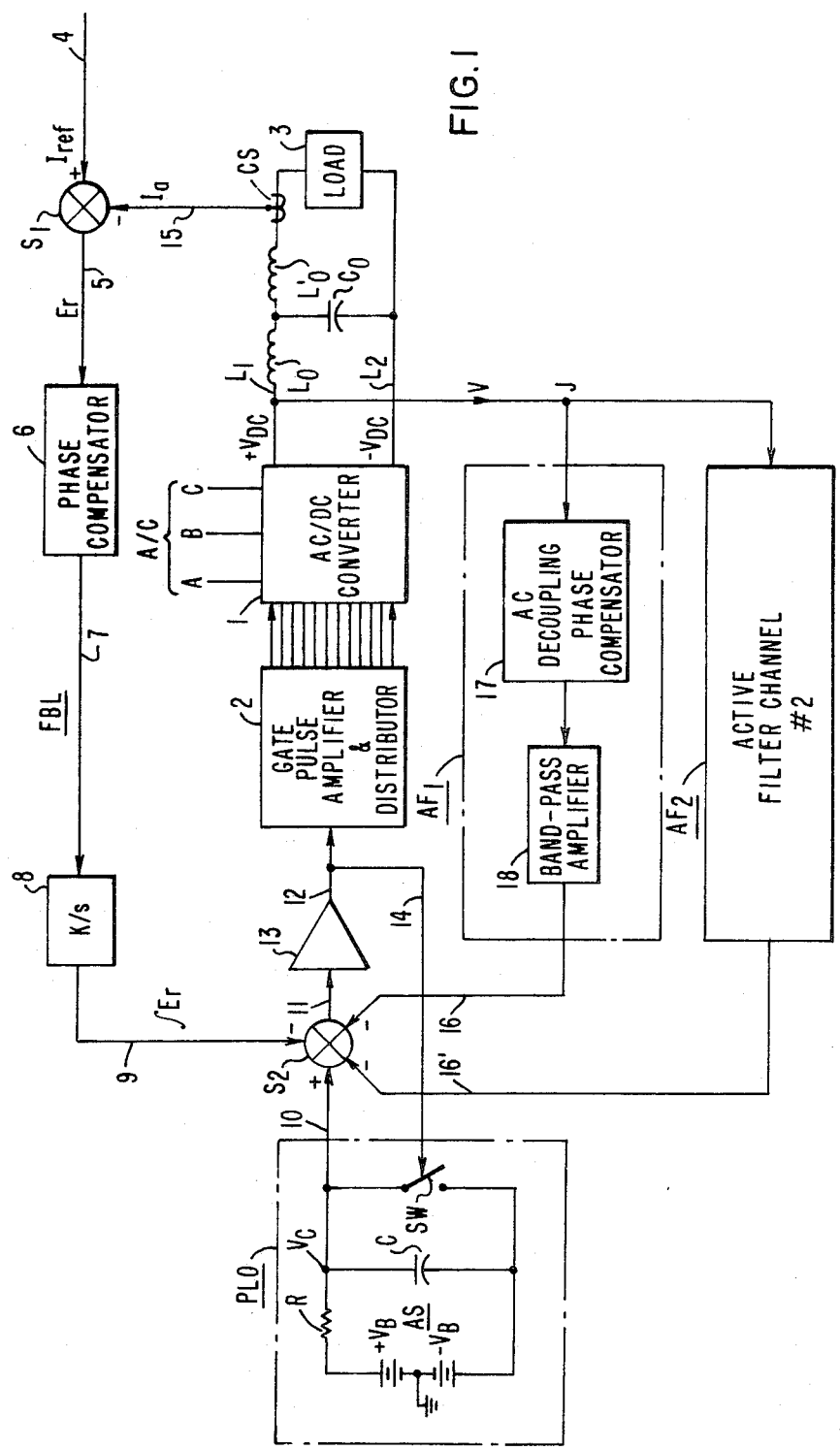
FIG. 1 is a block diagram representation of the converter system according to the invention.

Referring to FIG. 1, the block diagram of an AC/DC converter 1 of the thyristor-controlled type is shown with the associated gate pulse amplifier and distributor circuit 2 which controls the firing angle of the thyristors to provide between terminals $L_1$, $L_2$ a DC output ($+V_{DC}$ on terminal $L_1$, $-V_{DC}$ on terminal $L_2$). The usual DC passive filter comprising inductances $L_0$, $L'_0$ and capacitor $C_0$ arranged in a T across terminals $L_1$ and $L_2$ serves to attenuate the harmonics which are theoretically present in the DC output voltage at frequencies $f = k \cdot p \cdot f_s$, where $f_s$ is the AC supply frequency, p is the converter's pulse number and $k = 1, 2, 3, \ldots$ any positive integer defining the harmonic order. Thus, the lowest harmonic frequency theoretically present is $p \cdot f_s$.

A load 3 is connected at the output of converter 1 after the passive filter.

Figure 2:
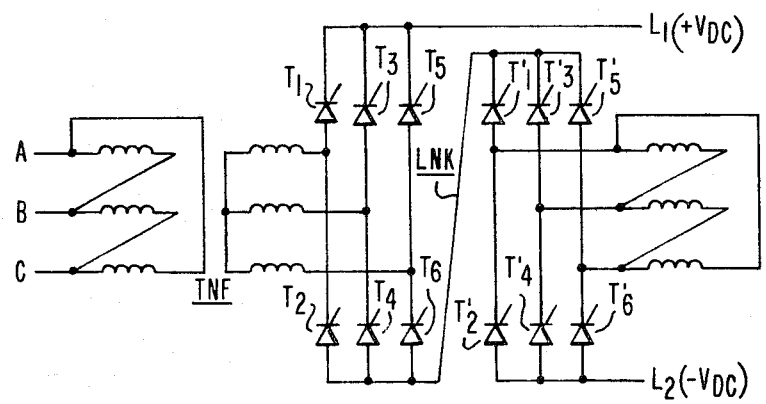
FIG. 2 is illustrative of a thyristor bridge as can be used in the converter system of FIG. 1.

FIG. 2 shows illustratively a 12-pulse AC/DC converter that can be used as the AC/DC converter 1 of FIG. 1. Two 6-thyristor bridges are mounted in series between DC terminals $L_1$ and $L_2$. The three phases A, B, C of the AC power supply are applied to the delta primary of a transformer TNF. The Y-connected secondary of the transformer is linked to the respective junction points between three thyristors $T_1$, $T_3$, $T_5$ on the positive polarity side of the first bridge FB and three thyristors $T_2$, $T_4$, $T_6$ on the negative polarity side thereof. The positive polarity side of bridge FB is connected to terminal $L_1(+V_{DC})$. The negative polarity side is connected via a link LNK to the positive polarity side of a second bridge SB, e.g., to the cathodes of three thyristors $T_1'$, $T_2'$ and $T_3'$ thereof. The three other thyristors ($T'_2$, $T'_4$ and $T'_6$) of bridge SB have their anodes connected to the negative terminal $L_2$, ($-V_{DC}$). The junction points between ($T'_1$, $T'_2$), ($T'_3$, $T'_4$) and ($T'_5$, $T'_6$) are connected to a second secondary winding of the transformer in a delta configuration. The turn-ratio of the delta-connected secondary windings with respect to the Y-connected secondary windings is $\sqrt{3}$ to 1.

With such an arrangement, the theoretical harmonics of the DC output are given by $f_h = k \cdot 12 \cdot 60$ for a 60 Hz AC power supply. The harmonics are therefore 720 Hz; 1440 Hz; and so on.

Certain circuit imperfections of the converter system, such as uneven forward drop in the thyristors, fuses, and the bus work itself, for instance, will result in non-canonical harmonics of the odd order, namely; 60 Hz and 3·60 Hz=180 Hz. Imbalance in the three-phase supply voltage and transformer leakage reactances will cause a non-canonical harmonic of even order, namely; 120 Hz.

A properly designed L-C passive filter will minimize the theoretical harmonics. The filter is usually designed to provide adequate attenuation starting with the first theoretical harmonic, namely; $f_h = p \cdot f_s$. In the case of a 12-pulse converter $f_h = 12 \cdot 60 = 720$ Hz. However, L-C filters have a rapidly diminishing attenuation with decreasing frequency. Passive filtering, therefore will not attenuate the frequencies which are significantly lower than 720 Hz, unless filtering is specially designed to extend as low as those frequencies. This may be objectionable because a significantly larger and costlier L-C filter would be required. Without such filter, the harmonics at the non-canonical frequencies may exceed in magnitude the attenuated theoretical harmonics. Therefore, according to the present invention, it is proposed to use an "active filter" designed to reduce the non-canonical harmonics. The active filter operates through control means affecting the firing angle of the thyristors of the converter. Therefore, active filtering is applied independently from the passive filter which by design is effective only in regard to the theoretical harmonics to be eliminated from the DC output voltage of the converter.

Figure 3:
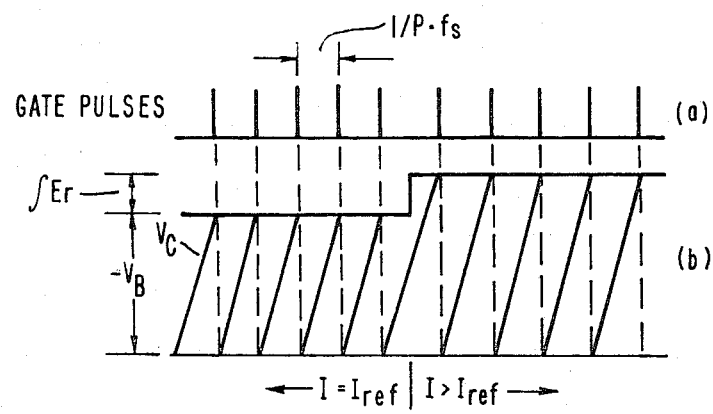
FIG. 3 illustrates control of the firing angle of the thyristors by the phase-locked oscillator used in the circuit of FIG. 1 in accordance with a change in the converter output current.

The output of the AC/DC converter 1 in FIG. 1 is controlled by the gate pulse amplifier and distributor circuit 2 in accordance with a reference current $I_{ref}$, supplied on line 4 and with the actual output current signal $I_a$ derived on line 15 from a current sensor CS coupled with the load current after the DC filter. Summer S$_1$, provides in response to $I_{ref}$ and $I_a$ an error signal (Er) which is passed through a feedback loop FBL including line 5, phase compensator 6, line 7, and integrator 8 of transfer function (K/s) which outputs the integrated error signal $\int Er$ on line 9. The signal of line 9 is applied to a summer S$_2$ where it is subtracted from the sawtooth-shaped signal produced by a variable voltage and frequency oscillator of the phase-lock type PLO designed in accordance with the technique shown in U.S. Pat. No. 3,713,012 of F. O. Johnson. The Johnson patent is hereby incorporated by reference. The phase-locked oscillator PLO includes an auxiliary DC source AS charging a capacitor C via a resistance R resulting in a rising voltage ramp across C. An externally controlled switch SW periodically discharges capacitor C and starts a new sawtooth wave at the output 10. The phase-locked oscillator PLO operates in conjunction with the gate pulse amplifier of circuit 2 as follows:

The lower electrode of capacitor C is negatively biased by auxiliary source AS to $-V_B$. As capacitor C charges up to a ramp-like increasing $V_C$ voltage, its upper electrode is at the rising potential $V_C - V_B$ with respect to ground. This potential is applied via line 10 to summer S$_2$ and thereafter by line 11 onto a comparator 13 which is in the form of a zero detector, namely having a threshold voltage equal to 0. When the upper electrode of capacitor C reaches 0 potential, comparator 13 triggers the gate pulse amplifier circuit 2 by line 12. At the same time, by line 14 and switch SW, capacitor C is caused to be discharged instantly thereby to initiate another ramp. The preceding is under the assumption that the error integral signal of line 9 is zero. Then, the triggering ramps from line 10 are as shown by the left portion of curve (b) on FIG. 3. Gating of the AC/DC converter is by pulses in accordance with the changed state of comparator 13, via line 12. Therefore, triggering of the thyristors by the output of circuit 2 is like shown by pulses (a) of FIG. 3. Circuit 2 includes a gate pulse amplifier which amplifies the triggering pulses, and a distributor which cyclically distributes the pulses received from comparator 13 among the gating electrodes of the several thyristors. The phase-locked oscillator is adjusted so that subsequent to being discharged by switch SW, the upper electrode of capacitor C reaches ground potential in $1/(p \cdot f_s)$ seconds so that the gate pulses delivered to the thyristors stay in synchronism with the AC supply and maintain constant the DC output voltage between terminals L$_1$, L$_2$ when there is a zero error integral signal on line 9.

It is assumed now that $I_a$ becomes larger than $I_{ref}$. The error integral signal from line 9 decreases from zero. Therefore, charging of capacitor C lasts longer before the combined voltage $-V_B + V_C - \int Er$ fed to zero detector 13 on line 11 reaches zero with respect to ground and the occurrence of a reset to zero by line 14 and switch SW. Accordingly, the amplitude at the ramps increases as shown on the right of curves (b) of FIG. 3. As a result, the spacing between pulses, as shown under (a), is increased and the firing angle is gradually increased. As a result the converter's DC output voltage $V_{DC}$ and current $I_a$ are decreased until the error integral signal of line 9 has been brought back to zero. The same can be said if, instead of increasing, $I_a$ goes below $I_{ref}$. Thus, in either case, the phase-locked oscillator PLO locks itself automatically at $p \cdot f_s$ frequency as soon as the error in the output current has been corrected. This technique is described with more detail in the aforementioned Johnson patent.

If the converter's output voltage $V_{DC}$ and, consequently, the output current $I_a$ contains low frequency non-canonical harmonics, these harmonics will generate an error signal Er of identical frequency. In principle, the closed loop FBL could be used to attenuate these harmonics. However, this would require a large loop gain. For instance, to obtain an attenuation of 10, it will require a 20 dB gain at angular frequencies of $\omega = 377$, 754 and 1131 rad/sec, corresponding to frequencies of $f_h = f_s$, $2f_s$ and $3f_s$, respectively. This is incompatible with the stability criteria of the closed loop control system.

In accordance with the present invention, it is proposed, instead, to employ active filters, one active filter for each frequency. Each such active filter is in the form of a band-pass amplifier tuned to the objectionable non-canonical harmonic frequency. Referring to FIG. 1, two such active filters AF$_1$, AF$_2$ are illustrated. In each channel the band-pass amplifier generates on feedback line 16, or 16', a corrective signal of the given frequency and of proper amplitude which is to be summed up at S$_2$ with the error integral signal from line 9. Thus, the superimposed corrective signal applied through S$_2$ is fed by line 11 into the input of zero detector 13.

Figure 4:
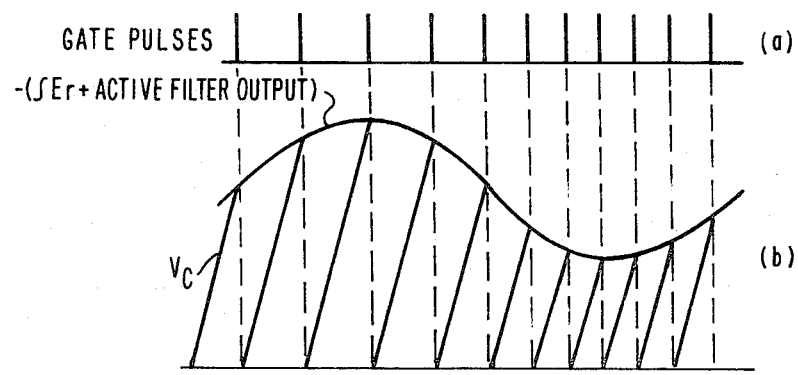
FIG. 4 shows the effect of the phase-locked oscillator on the thyristor gating pulses when affected by the harmonic component feedback through the active filter inserted in the circuit of FIG. 1 in accordance with the present invention.

As illustrated in FIG. 4 the signal of line 16, or 16', superimposes a component varying at the non-canonical frequency which results in a modulation of the gating intervals (curve a) about the average $1/(p \cdot f_s)$ value established by the current regulating loop FBL. The corrective signal of line 16, or 16', assumes the proper amplitude and phase so that the resulting voltage modulation of the output voltage between L₁ and L₂ attenuates the modulation represented by such non-canonical harmonic in the ratio defined by the cumulative gain of the converter and the corresponding active filter channel. To this effect, at junction J, the harmonic component is derived from the unfiltered DC output voltage of the converter. In each channel the active filter (AF₁, AF₂), includes an AC decoupling and phase compensator circuit 17 for the purpose of decoupling the AC ripple content of the unfiltered DC voltage and to provide the gain/phase compensation necessary for stable operation. The undesired frequency component is extracted by a band-pass amplifier 18 tuned to the non-canonical harmonic frequency. The remainder of the distortion spectrum is rejected by the band-pass amplifier 18. In effect, each active filter loop acts as a closed-loop voltage control circuit (with zero voltage reference), having a high gain (typically 30 dB) at the specific non-canonic harmonic frequency and in its immediate vicinity, but a negligible gain over the remainder of the frequency spectrum. Since the current feedback loop has negligible gain at the objectionable non-canonical harmonic frequencies, its operation is not affected by the active filter channels.

Figure 5:
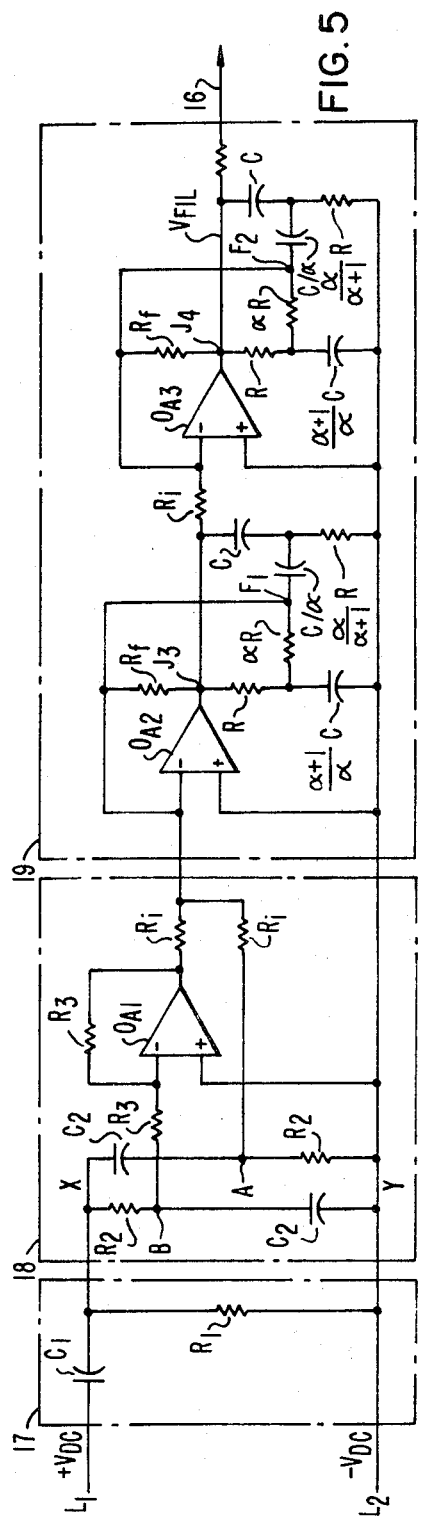
FIG. 5 is detailed circuitry of an active filter channel such as can be used in the circuit of FIG. 1.
Figure 6:
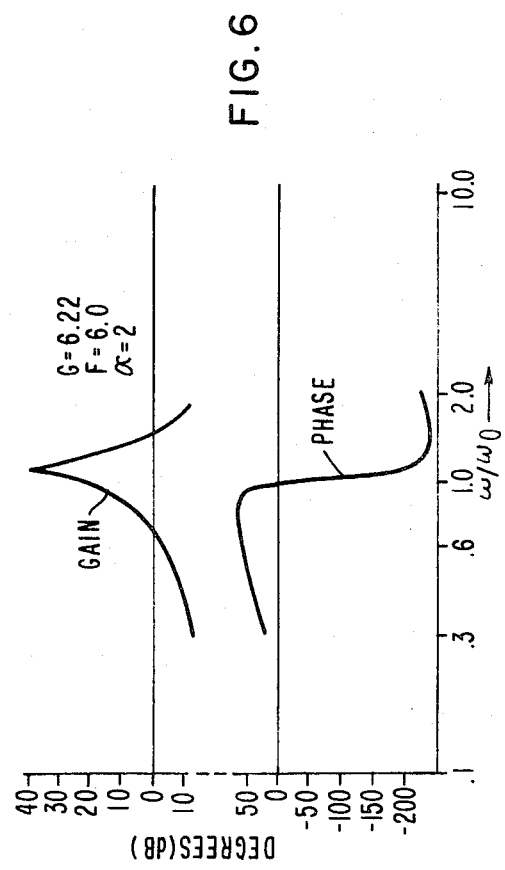
FIG. 6 is a Bode diagram stressing the selective response of an active filter, according to the invention, to the particular frequency of the undesired non-canonical harmonics.

Actual circuitry for the active filter (AF₁, or AF₂), including the transfer functions of the circuit elements, is illustrated in FIG. 5. A Bode diagram of the band-pass amplifier 18 is shown in FIG. 6. The active filter AF₁ includes three sections: an AC decoupler section 17, a phase compensator section 18 and a band-pass amplifier section 19 (FIG. 5).

Section 17 is a conventional ($C_1R_1$) high-pass filter circuit having a voltage $V_{DC}$ (which is the raw output voltage of the converter between $L_1$ and $L_2$) at the input $V_i$ and an output voltage $V_O = V_{XY}$ between terminals X and Y of section 17. Its gain at an arbitrary angular frequency $\omega$ is $$\left|\frac{V_o}{V_i}\right| = \frac{\omega/\omega_1}{[1 + (\omega/\omega_1)^2]^{\frac{1}{2}}}$$

where $\omega_1 = 1/R_1C_1$. The phase shift between $V_i$ and $V_o$ is $\phi = 90° - \arctan(\omega/\omega_1)$.

Section 18 is a bridge arrangement of capacitances and resistances $C_2$, $R_2$ mounted across terminals X and Y. The input voltage is $V_i = V_{XY}$ between X and Y. The output voltage is $V_o = V_{AB}$ between respective junction points A and B of the two series networks $C_2$ $R_2$, one across X and Y, the other across Y and X. The circuit relations for section 18 for an arbitrary angular frequency $\omega$ are: $|V_o/V_i| = 1$ and $\phi = 180° - 2 \arctan(\omega/\omega_2)$ where $\omega_2 = 1/R_2C_2$.

Section 18 includes a summing amplifier built around operational amplifier OA₁ to provide a signal $V_{AB}$ fed as input to operational amplifier OA₂ in section 19. Section 19 operates as a band-pass amplifier. It consists of two identical cascaded stages built around respective operational amplifiers OA₂, OA₃. Each stage employs a twin-T feedback network tuned to the particular harmonic frequency which is to be attenuated by the active filter. Each twin-T feedback network is comprised of the following: (1) a first series network, connected between operational amplifier output and line L2 and including: a resistor R and a capacitor of value $[(\alpha+1)/\alpha]$ C, where $\alpha$ is a design constant which determines the selectivity of the band-pass effect; (2) a second and similar series network parallel thereto and including a capacitor C and a resistor $[(\alpha/\alpha+1)]$ R. The transversal branch is a series network including a resistor $\alpha R$ and a capacitor $C/\alpha$ mounted across the junction points of the two other series-networks. The junction point (F₁ for OA₂, F₂ for OA₃) of the transversal branch is connected to the inverting input of the associated operational amplifier. In addition, a feedback resistor $R_f$ is provided between the output and the inverting input. At the tuned frequency $f = 1/(2\pi RC)$, the output of the twin-T network at point F₁ or F₂ is zero with respect to line L2. Thus, at the tuned frequency the gain of each amplifier (OA₂, or OA₃) is defined by feedback resistor $R_f$. At other frequencies the output of each twin-T network, at F₁ or F₂, is proportional to the output of the amplifier (OA₂ or OA₃) and through the zero resistance feedback path from F₁, or F₂, to the operational amplifier inverting input, these outputs are drastically attenuated. The output of section 19 is $V_{FIL}$. The latter is connected to summer S₂, as earlier stated, by line 16 for AF₁, by line 16' for AF₂.

The gain of section 19 as a function of an arbitrary angular frequency $\omega$ is:

$$\left|\frac{V_o}{V_i}\right| = \frac{[1 + (\omega/\omega_o)]^2 \cdot G^2}{\left[\frac{1 - (\omega/\omega_o)^2}{\delta + 1} \cdot GF + 1\right]^2 + [\omega/\omega_o]^2}$$

The phase shift between $V_i$ and $V_o$ is $$\phi = 2\left\{ \arctan(\omega/\omega_o) - \arctan\frac{\omega/\omega_o}{1 + \frac{1}{\delta + 1}[1 - (\omega/\omega_o)^2] \cdot GF} \right\}$$

where
ti $\omega_o = 1/RC$; $G = R_f/R_i$; $F = R_i/R$; $V_i = V_{AB}$; $V_o = V_{FIL}$ As can be seen on FIG. 6, the band-pass amplifier so defined has a maximum gain at $\omega/\omega_o = 1.03$. To obtain maximum gain at the frequencies to be filtered, the $\omega_o$ frequency of each channel is selected to be $\omega_o = 2\pi f_h/1.03$. The $\omega_1$ corner frequencies of the AC decoupling networks and the $\omega_2$ corner frequencies of the phase compensating networks are selected to ensure adequate phase margin for stable operation both below and above the harmonic frequencies at which the gain of the band-pass amplifiers is maximum.

Figure 7:
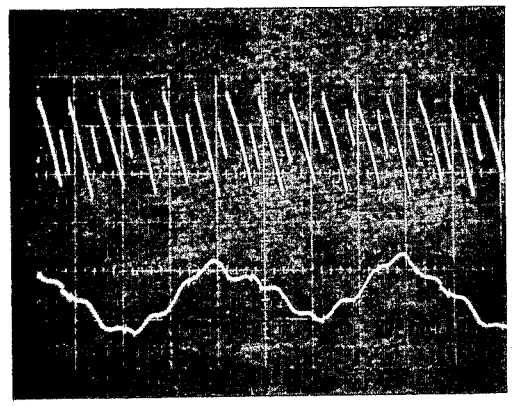
FIGS. 7 to 14 are oscillograms illustrating operating signals at different locations of the circuits of FIGS. 1 and 5 with, or without, active filtering action.
Figure 8:
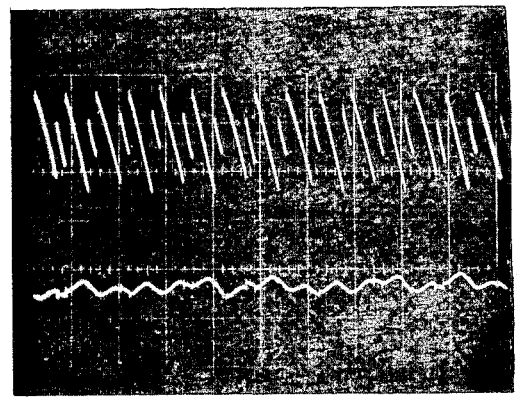

The operation of the active filter is further illustrated by the oscillograms shown in FIGS. 7 to 14. These oscillograms were derived with a 12-pulse converter, with $V_{DC} = 40$ V and $I_{DC} = 50$ A at the output, operating from a 60 Hz three-phase source. The upper trace on FIG. 7 shows the unfiltered DC output voltage of the converter. The lower trace, shown at a 10-times enlarged scale, shows that the filtered DC voltage across the load exhibits a low frequency ripple of about 0.6 volt peak-to-peak in the absence of active filter channels. FIG. 8 shows the same two signals when three active filter channels, tuned to 60 Hz, 120 Hz and 180 Hz respectively, are connected. The result is a significant reduction of the low frequency ripple.

Figure 9:
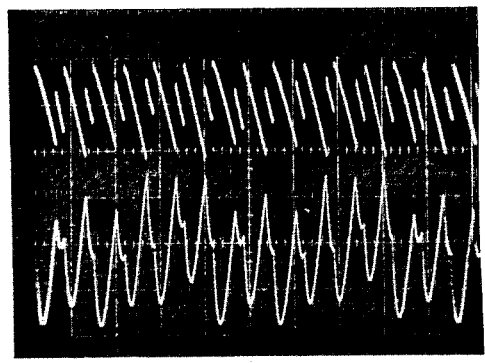
Figure 10:
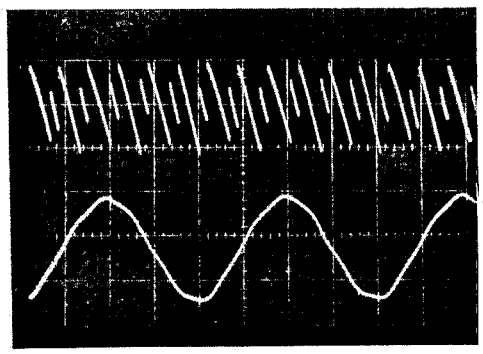
Figures 11, 12:
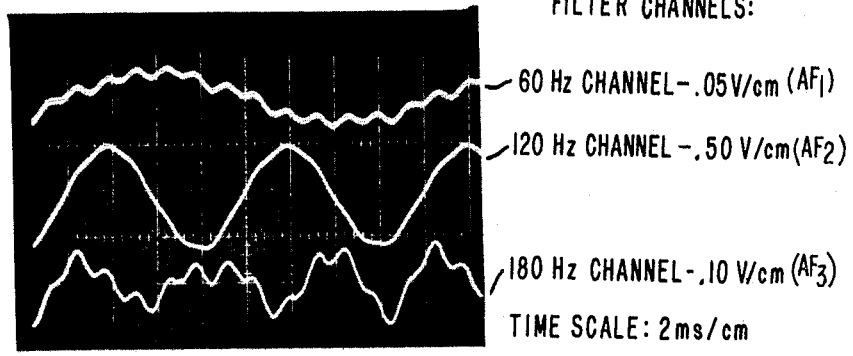

FIGS. 9 and 10 show the first and second stage output of a 120 Hz active filter channel; FIG. 11 shows the outputs of 60, 120 and 180 Hz channels fed to the summing amplifier S2.

FIG. 12 typically shows the phase-locked oscillator output signal of line 10 and the error integral signal of line 9 which are summed-up and fed to the zero detector 13. The smooth curve indicates the error integral signal of line 9. The ramp-like curves are the capacitor voltage of the phase-locked oscillator appearing on line 10. A gate pulse is caused by line 12 to be generated each time there is an intersection between the two signals. In this instance the active filter channels are disconnected.

Figure 13:
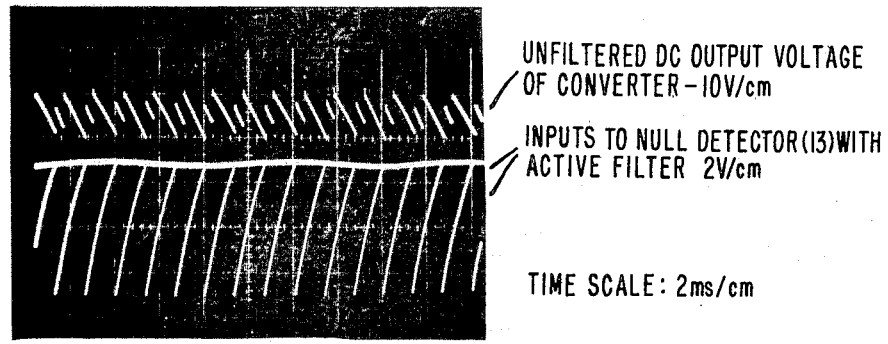
Figure 14:
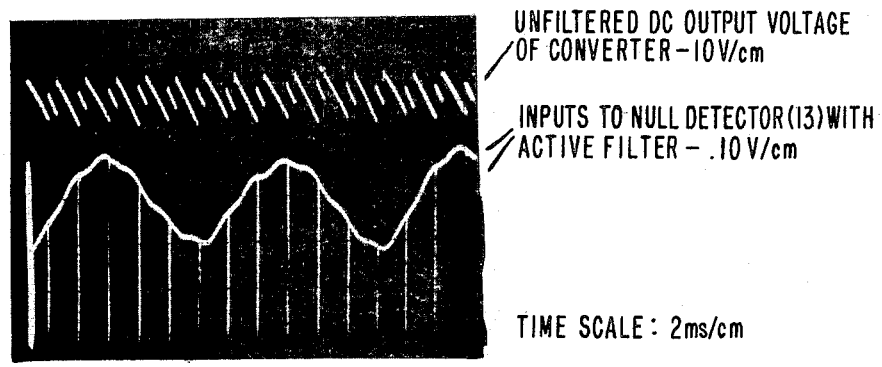

FIG. 13 shows the same two signals when the combined output of three active filter channels for 60, 120 and 180 Hz such as $AF_1$, $AF_2$ is superimposed on the error integral. This causes a minor correction in the gate pulse timing to the extent necessary to reduce the low frequency harmonic components. The same two signals are shown in FIG. 14 at a 20-times enlarged scale.

What we claim is:

1. In a converter system having a plurality of thyristors connected for controlled conduction between an AC power supply and DC terminals for outputting DC voltage and DC current, the combination of:

control means responsive to the output of said DC terminals for establishing a firing angle for said thyristors in accordance with a desired DC output;

feedback means responsive to undesired harmonic contents of said DC output for modifying the operation of said control means in magnitude and phase to compensate for such undesired harmonic content between said DC terminals; said feedback means including a plurality of band-pass amplifiers each tuned to the frequency of an undesired harmonic component in said output DC voltage; and summing means responsive to each of said band-pass amplifiers for concurrently modifying the operation of said control means in magnitude and phase in accordance with the magnitude and frequency of a corresponding one of said plurality of undesired harmonic components existing in said output DC voltage; thereby to provide harmonic reduction.

2. The converter system of claim 1 with each of said band-pass amplifiers having a high gain over a narrow frequency band around the corresponding harmonic frequency and a large attenuation outside said narrow band.

3. The converter system of claim 2 with each of said band-pass amplifiers including several cascaded operational amplifiers, each of said operational amplifiers having a twin-T feedback network providing an output defining a feedback loop with the associated operational amplifier, each said twin-T network having a zero output at the corresponding harmonic frequency and a proportional output outside such corresponding harmonic frequency.

4. The converter system of claim 3 with AC decoupler means associated with each of said band-pass amplifiers and connected to the DC output voltage of said thyristor converter; and phase compensator means connected between each said AC decoupler means and the input of the corresponding said band-pass amplifier, for providing active filtering through said associated band-pass filter and said control means.

5. The converter system of claim 4, with said control means including a gate pulse amplifier for establishing triggering pulses for said thyristors, and a voltage-to-frequency converter responsive to the output of said DC terminals and to a reference signal for establishing said firing angles in relation to said reference signal; said voltage-to-frequency converter being further responsive to said band-pass amplifiers.

6. In a static-controlled converter system for the generation of a DC output by rectification of an AC input through a plurality of semiconductor controlled rectifiers in accordance with a control signal establishing a selected firing angle for said plurality; the method of minimizing harmonic contents in said DC output comprising the steps of:

deriving from said output a first signal representative of a non-canonical harmonic component in said AC output;

deriving from said output a second signal representative of another non-canonical harmonic component;

controlling the firing angle of said semiconductor controlled rectifiers concurrently with said control signal, with said first representative signal and with said second representative signal thereby to minimize the first-mentioned and second-mentioned non-canonical harmonic component from said DC output;

with said first and second deriving steps each including gain and phase compensation for the associated signal to improve closed-loop stability through said converter system.

7. The method of claim 6 with each of said controlling steps introducing a negative reaction by the corresponding representative signal of selected magnitude in affecting said firing angle to obtain said harmonic content minimization in regard of the corresponding non-canonical harmonic component.

* * * * *